US010332127B2

(12) United States Patent
Tuteja et al.

(10) Patent No.: US 10,332,127 B2
(45) Date of Patent: Jun. 25, 2019

(54) TREND DATA AGGREGATION

(71) Applicant: Wal-Mart Stores, Inc., Bentonville, AR (US)

(72) Inventors: Bhupesh Tuteja, San Jose, CA (US); Amit Khanchi, Foster City, CA (US); Abhay Maruti Kamble, Cupertino, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 252 days.

(21) Appl. No.: 14/169,780

(22) Filed: Jan. 31, 2014

(65) Prior Publication Data

US 2015/0220938 A1 Aug. 6, 2015

(51) Int. Cl.
*G06Q 30/02* (2012.01)

(52) U.S. Cl.
CPC .............. *G06Q 30/0201* (2013.01)

(58) Field of Classification Search
CPC .... H04L 9/0844; H04L 9/3297; H04W 12/04; G06Q 30/0201; G06Q 30/02
USPC ...................................... 705/7.29
See application file for complete search history.

(56) References Cited

U.S. PATENT DOCUMENTS

| 6,581,064 B1 * | 6/2003 | Senjalia ............ G06F 17/30312 |
| 9,092,421 B2 | 7/2015 | Chowdhury et al. |
| 2002/0198939 A1 | 12/2002 | Lee |
| 2004/0034773 A1 * | 2/2004 | Balabine .................. A63F 13/12 713/168 |
| 2006/0064428 A1 * | 3/2006 | Colaco ..................... G06F 16/86 |
| 2006/0069589 A1 | 3/2006 | Nigam et al. |
| 2006/0129446 A1 * | 6/2006 | Ruhl ........................ G06Q 30/02 705/306 |
| 2006/0212491 A1 * | 9/2006 | Agrawal ............. G06F 21/6227 |
| 2008/0301123 A1 * | 12/2008 | Schneider ......... G06F 17/30545 |
| 2010/0017603 A1 * | 1/2010 | Jones .................... H04L 9/0844 713/168 |
| 2010/0121707 A1 | 5/2010 | Goeldi |
| 2010/0268661 A1 * | 10/2010 | Levy ...................... G06Q 30/02 705/347 |
| 2010/0280882 A1 * | 11/2010 | Faith ................ G06Q 10/06375 705/7.37 |
| 2011/0004483 A1 * | 1/2011 | Ting ..................... G06Q 30/02 705/1.1 |

(Continued)

OTHER PUBLICATIONS

Stack Overflow, "How to ensure a timestamp is always unique?" post by Justin Waugh, Apr. 10, 2011, pp. 3-4.*

(Continued)

*Primary Examiner* — Renae Feacher
(74) *Attorney, Agent, or Firm* — Bryan Cave Leighton Paisner LLP

(57) ABSTRACT

Systems and methods are provided for collecting, sorting, and reporting data sets representing transactions, product reviews, social media product mentions, or the like. According to embodiments of the present disclosure, a trend aggregation system includes a backend data collector, a trend database, and a trend server. Data may be gathered from heterogeneous sources such as transaction records, product reviews posted by consumers on web sites, and product mentions posted on social network platforms. The data may be sorted and stored in a way to provide recall of trend data segments filtered according to selected parameters.

20 Claims, 4 Drawing Sheets

(56) References Cited

U.S. PATENT DOCUMENTS

| | | | |
|---|---|---|---|
| 2011/0145398 A1 | 6/2011 | Bansal | |
| 2011/0179114 A1 | 7/2011 | Dilip et al. | |
| 2011/0307312 A1* | 12/2011 | Goeldi | G06Q 10/00 |
| | | | 705/14.6 |
| 2011/0320482 A1 | 12/2011 | Barbieri et al. | |
| 2012/0303411 A1 | 11/2012 | Chen | |
| 2013/0054551 A1* | 2/2013 | Lange | G06F 16/21 |
| | | | 707/706 |
| 2013/0073336 A1* | 3/2013 | Heath | G06Q 30/02 |
| | | | 705/7.29 |
| 2013/0346234 A1* | 12/2013 | Hendrick | G06Q 30/0631 |
| | | | 705/26.7 |
| 2014/0067596 A1 | 3/2014 | McGovern | |
| 2014/0079217 A1* | 3/2014 | Bai | H04L 63/0869 |
| | | | 380/270 |
| 2014/0337436 A1* | 11/2014 | Hoagland | G06F 17/30867 |
| | | | 709/204 |

OTHER PUBLICATIONS

Berger, Jonah and Iyengar, Raghuram, "Communication Channels and Word of Mouth: How the Medium Shapes the Mesage," 2013 by Journal of Consumer Research, Inc. • vol. 40 • Oct. 2013.*

Nelson, Ray, "How to Use Social Media for Market Research," Social Media Today, Mar. 19, 2013, https://www.socialmediatoday.com/content/how-use-social-media-market-research.*

Brandel, Mary, "Are you Listening?" Computerworld, Oct. 26, 2010.*

* cited by examiner

TREND DATA AGGREGATION

BACKGROUND

In recent time, social networks have pervaded the daily life of many millions of people. Hundreds of social networking and social sharing platforms, including microblogging and similar services, facilitate millions of shared messages on a daily basis. Many users post messages regarding recent purchases, product reviews, or simply to discuss products that hold interest to them. Merchants have attempted to utilize data culled from such messages to supplement traditional marketing and advertising activities and thereby profit from that data.

The challenges of gathering such data from a variety of heterogeneous platforms, aggregating that data, and presenting representations of that data to consumers in a useful format have proved difficult for merchants to overcome.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
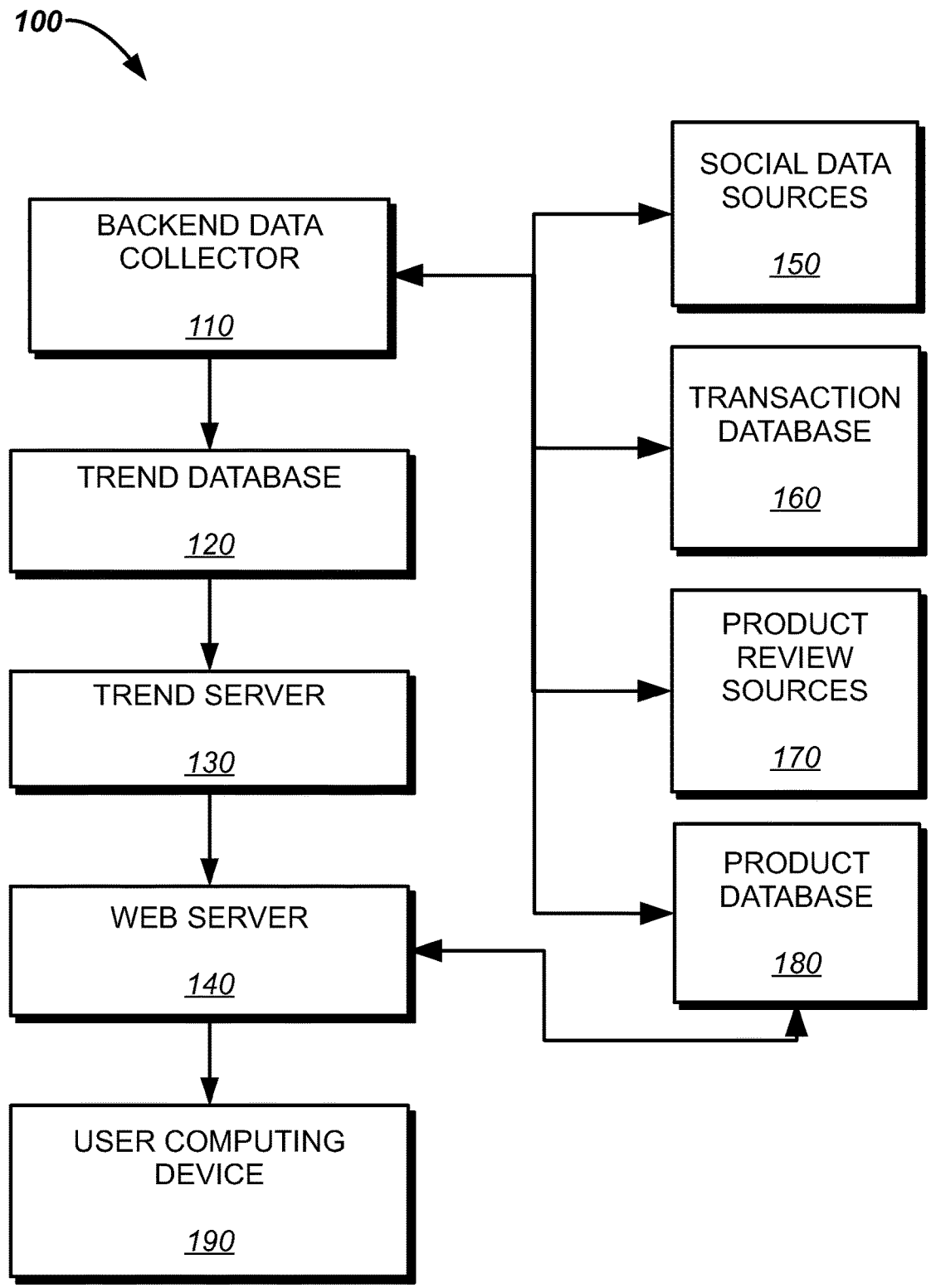
FIG. 1 is a block diagram illustrating components of a trend aggregation system according to an embodiment of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

The present disclosure extends to methods, systems, and computer programs for presentation of aggregated trending data regarding item purchases and/or social media mentions in real-time or near real-time. In the following description, reference is made to the accompanying drawings that form a part hereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the spirit and scope of the present disclosure. The following detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flowcharts and block diagram in the attached figures illustrate the architecture, functionality, and operation of possible implementations of systems, methods, and computer program products according to various embodiments of the present disclosure. In this regard, each block in the flowchart or block diagram may represent a module, segment, or portion of code, which comprises one or more executable instructions for implementing the specified logical function(s). It will also be noted that each block of the block diagram and/or flowchart illustrations, and combinations of blocks in the block diagram and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagram block or blocks.

Embodiments of the present disclosure may provide real-time or near real-time trending products data aggregated from a variety of data sources relating to trend type activities. Such trend type activities may be depicted in terms of what products customers have recently reviewed, mentioned, and/or purchased. Such data may be collected and aggregated from social network platforms, transaction databases, and the like. Embodiments of the present disclosure can be implemented by a retailer to encourage potential customers to make purchases based on reviews and purchases by other people.

Referring to FIG. 1, according to embodiments of the present disclosure, trend aggregation system 100 comprises backend data collector 110, trend database 120, and trend server 130. In an embodiment, web server 140 is adapted to transmit a graphical user interface to users. The graphical user interface may comprise an e-commerce webpage. In embodiments, the graphical user interface is embodied in a webpage that is encoded in a markup language such as HTML and may be transmitted to a user computing device 190 for display to the user. Web server 140 can query trend server 130 for current trending products or services and transmit the trending information to the user device 190, as will be set forth in further detail. The graphical user interface may be transmitted to the user in one or more files via a communication network, including, for example, the Internet, from web server 140 to user computing device 190. In an embodiment, the user interface comprises an app installed on a user's mobile computing device 190 such as a smartphone. In such cases, the web server 140 can transmit computer-readable data to the user's mobile computing device 190, which device 190 can subsequently display a representation of the data to the user as trending products.

Social data sources 150 include social media platforms, social messaging platforms, and the like. Transaction database 160 comprises records of recent transactions. In embodiments, transaction database 160 includes product name, stock-keeping unit ("SKU") or like product identification code, pricing information, product category, date and time of transaction completion, and other data relevant to completed transactions. In an embodiment, product review sources 170 comprise one or more databases storing product reviews supplied by consumers. A product review source 170 can include a product identifier and a score assigned by the reviewer.

In embodiments, backend data collector 110 is adapted to traverse one or more social data sources 150 and seek reviews, mentions, or any other references of products. In one embodiment, backend data collector 110 searches product review sources 170 for reviews of a product having a quantifiable rating assigned by the reviewer (e.g., a number of stars given as part of the review). In other embodiments, backend data collector 110 searches for mentions of the product in social network messages, analyzes text strings for positive or negative terms that could be associated with the product, and assigns a rating score for the mention based on such positive and/or negative terms. Specific products can be identified in a particular social media message by matching keywords relating to the product with words in the message. In embodiments, backend data collector 110 is adapted to receive, from one or more transaction database 160, sales data corresponding to selected products.

According to an embodiment of the present disclosure, backend data collector 110 can collect data corresponding to multiple different trend types. As examples of trend types, an embodiment of backend data collector 110 collects data related to best-rated products, newly pinned products (e.g., a product highlighted by a user in the social sharing platform Pinterest), best seller products, recently reviewed products, just sold products, and/or products mentioned in other social platforms. In alternative embodiments, backend data collector 110 collects data related to other sets of trend types.

Embodiments of backend data collector 110 are further adapted to analyze and aggregate the sales data and transmit the aggregated data to trend database 120. In an embodiment, sales data received by backend data collector 110 includes a unique product identifier and a transaction timestamp. In another embodiment, sales data received by backend data collector 110 additionally includes a product category identifier. An embodiment of the present disclosure comprises product database 180. In embodiments, backend data collector 110 can query product database 180 for specific data regarding a particular product. Data that backend data collector 110 can receive from product database 180 may include price information, product images (or a uniform resource locator ("URL") directed at a product image), pricing, a product page URL, and other potentially relevant product information.

In embodiments, trend database 120 comprises a non-relational database structure. In embodiments, trend database 120 comprises a NoSQL database such as a Cassandra database. In an embodiment, trend database 120 stores an aggregation of trend data that was collected and categorized by backend data collector 110. According to embodiments, data may be stored within trend database in sets based on the timestamp of the associated transaction, social message, other trend action, and/or based on the product category.

In embodiments, the product category refers to general potential uses or characteristics of a product. In embodiments, examples of product categories may include "apparel," "electronics," "toys," "grocery," and "sports." In embodiments, additional product categories may be included. Some products may fall under two or more categories.

According to an embodiment of the present disclosure, trend data may be stored in two different types of rows within trend database 120. In embodiments, the data is inserted in trend database 120 as part of a batch, which may also be referred to herein as a "run."

Figure 2:
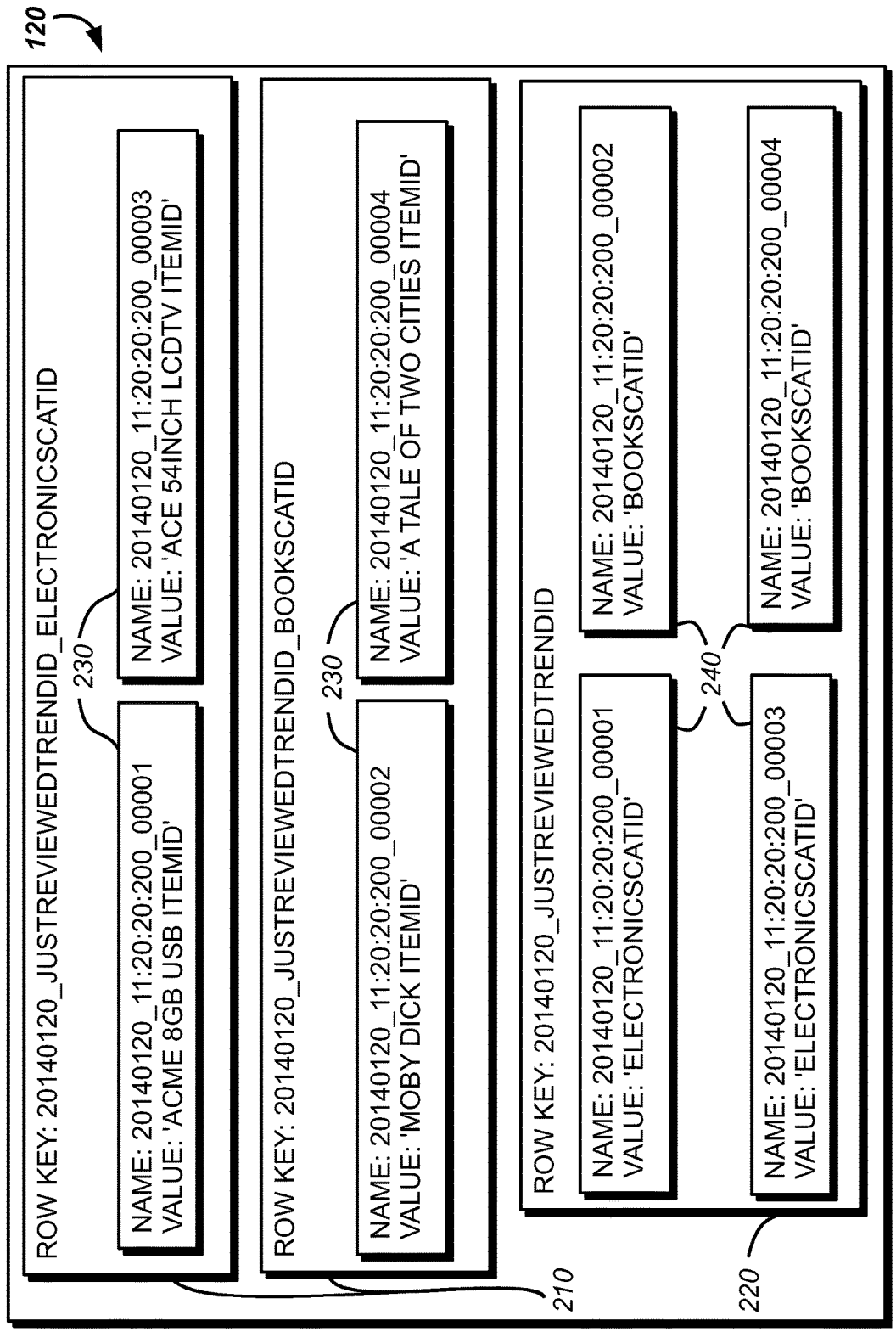
FIG. 2 is an illustration of a trend database according to embodiments of the present disclosure.

Referring now to FIG. 2, the two types of rows may be referred to herein as a "category row" 210 and a "trend type row" 220. In particular, embodiments of trend database 120 have, as the key for each category row 210, a date concatenated with a trend type and a product category name (or other category identifier). For example, a key may be "20140120_JUSTREVIEWEDTRENDID_ELECTRONICSCATID" for a category row 210 for products that were inserted into trend database 120 during a run on Jan. 20, 2014, which were identified as "just reviewed," and which fall under the "electronics" category.

As data is sorted into trend database 120, multiple product columns 230 may be inserted or updated in each category row 210. While the run is active, new product column 230 names and values can be inserted into the product column 230. After a run has completed for a particular category and date, a new run may begin. In embodiments, each name of a product column 230 comprises a concatenation of a timestamp and a counter value. The timestamp in each name of a product column 230 corresponds to the initialization time of the current run. The counter value corresponds to the number of total products that are the subject of a trend action that have been identified and inserted into trend database 120 during the current run. For example, a name may be "20140120_11:20:20:200_00004" for a product column 230 that represents a product and trend activity and that was inserted into trend database 120 during a run that commenced on Jan. 20, 2014 at 11:20:20:200, and for which four total products have been identified so far during that run. In an embodiment of a category row 210, the counter value in the name of the first product column 230 is initialized at 1 at the start of each scheduled run and incremented for each new product column 230 created in trend database 120 during the run. In an embodiment, each category row 210 has product columns 230 ordered by their respective timestamps and counter values, thereby resulting in a chronologically-ordered record of trend data.

Each value of a corresponding product column 230 comprises an identifier of a particular product that falls under the trend action and category denoted in the key of the category row 210 and that was identified within data collected by backend data collector 110 during the batch that commenced at the time indicated in the timestamp of its product column 230. For example, a value may be 'ACME 8 GB USB ITEMID' for a product column 230 for products fitting the "ACME 8 GB USB" identifier.

Embodiments of trend database 120 have, as the key for each trend type row 220, a date concatenated with a trend type identifier. Examples of various trend types that can be identified in a trend type row 220 key include: best-rated products, newly pinned products, best seller products, recently reviewed products, just sold products, and products mentioned in other social platforms. For example, a key may be "20140120_JUSTREVIEWEDTRENDID" for a trend type row 220 for categories that were inserted into trend database 120 during a scheduled run on Jan. 20, 2014, which were identified as "just reviewed."

As data is sorted into trend database 120, multiple category columns 240 may be inserted or updated in each trend type row 220. In embodiments, a name of a category column 240 comprises a concatenation of a timestamp and a counter value. The timestamp in each name of a category column 240 corresponds to the initialization time of the run. The counter value corresponds to the number of total products that are the subject of a trend action that have been identified and inserted into trend database 120 during the current run. For example, a name may be "20140120_11:20:20:200_00004" for a category column 240 for a category that was inserted into trend database 120 during a run that commenced on Jan. 20, 2014 at 11:20:20:200, and for which four total products have been identified so far during that run. In an embodiment of a trend type row 220, the counter value in the name of the first category column 240 is initialized at 1 at the start of each run and incremented for each new category column 240 created in trend database 120 during the run. As a result, in embodiments, each category column 240 has a corresponding product column 230 with a matching name; the pair of columns 230, 240 represents a single trend action. In an embodiment, each trend type row 220 has category columns 240 ordered by their respective timestamps and counter values, thereby resulting in a chronologically-ordered record of trend data.

Each value of the category column 240 comprises an identifier of a particular category that falls under the trend action denoted in the key of the trend type row 220 and that was identified within data collected by backend data collector 110 during the current run that commenced at the time indicated in the timestamp of its category column 240. For example, a value may be 'ELECTRONICSCATID' for a category column 240 for categories fitting the "electronics" identifier.

Figure 3:
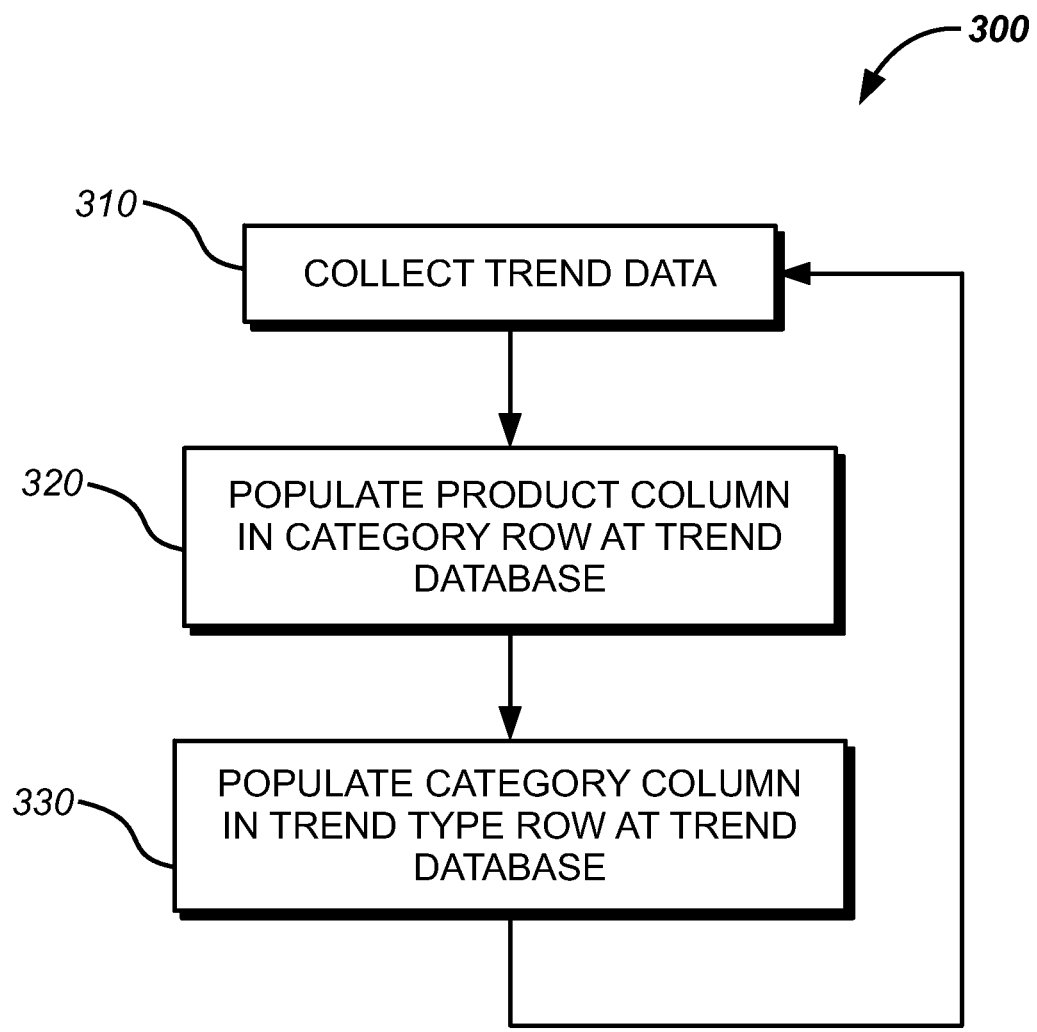
FIG. 3 is an illustration of an example method for collecting, sorting, and recording trend data.

In operation, data from heterogeneous sources may be aggregated and delivered in real-time or near real-time and filtered according to user selection. Referring now to FIG. 3, embodiments of the present disclosure comprise a method 300 for collecting, sorting, and recording trend data. At operation 310, backend data collector 110 gathers data from a variety of data sources. For example, backend data collector 110 receives, from transaction database 160, data relating to completed transactions. Additionally, backend data collector 110 traverses social data sources 150 for mentions of any products. As another example, backend data collector 110 receives, from product review sources 170, one or more reviews of a product. In an embodiment, backend data collector 110 is adapted to retrieve data related only to products that are offered for sale by a particular merchant. In another embodiment, backend data collector 110 is adapted to retrieve data related only to products that are offered for sale on a website by a merchant. In another embodiment, data may be gathered regarding virtually any product regardless of where the product is offered for sale.

At operation 320, data that was gathered by backend data collector 110 is sorted and recorded at trend database 120 by creating a product column 230 in a category row 210. In an embodiment, a new category row 210 is created each day for each trend type and product category combination that is identified in the data. In other embodiments, new category rows 210 are created at other time intervals. A new product column 230 is created and appended at the end of the appropriate row 210 for each product trend action that is identified. As described above, the name of a product column 230 comprises the timestamp corresponding to the commencement of the run, concatenated with a counter value. The counter value for the name of each product column 230 is incremented to reflect how many products were identified during that scheduled run. The value of each product column 230 is set to be a product identifier for the product At operation 330, data that was gathered by backend data collector 110 is sorted and recorded at trend database 120 by creating a category column 240 in a trend type row 220. In an embodiment, a new trend type row 220 is created each day (or other selected time periods) for each trend type identified in the data. A new category column 240 is created and appended at the end of the appropriate row 220 for each product that is identified. The name for each category column 240 comprises the timestamp corresponding to the commencement of the run, concatenated with a counter value. The counter value is incremented to reflect how many products were identified during that scheduled run.

As a result of method 300, the trend database 120 may include trend type rows 220 having category columns 240 sorted by timestamp and counter and category rows 210 having product columns 230 also sorted by matching timestamps and counters. Operations 310, 320, and 330 of method 300 may then be repeated as backend data collector 110 continues to seek and/or receive product reviews, mentions, and transactions.

Figure 4:
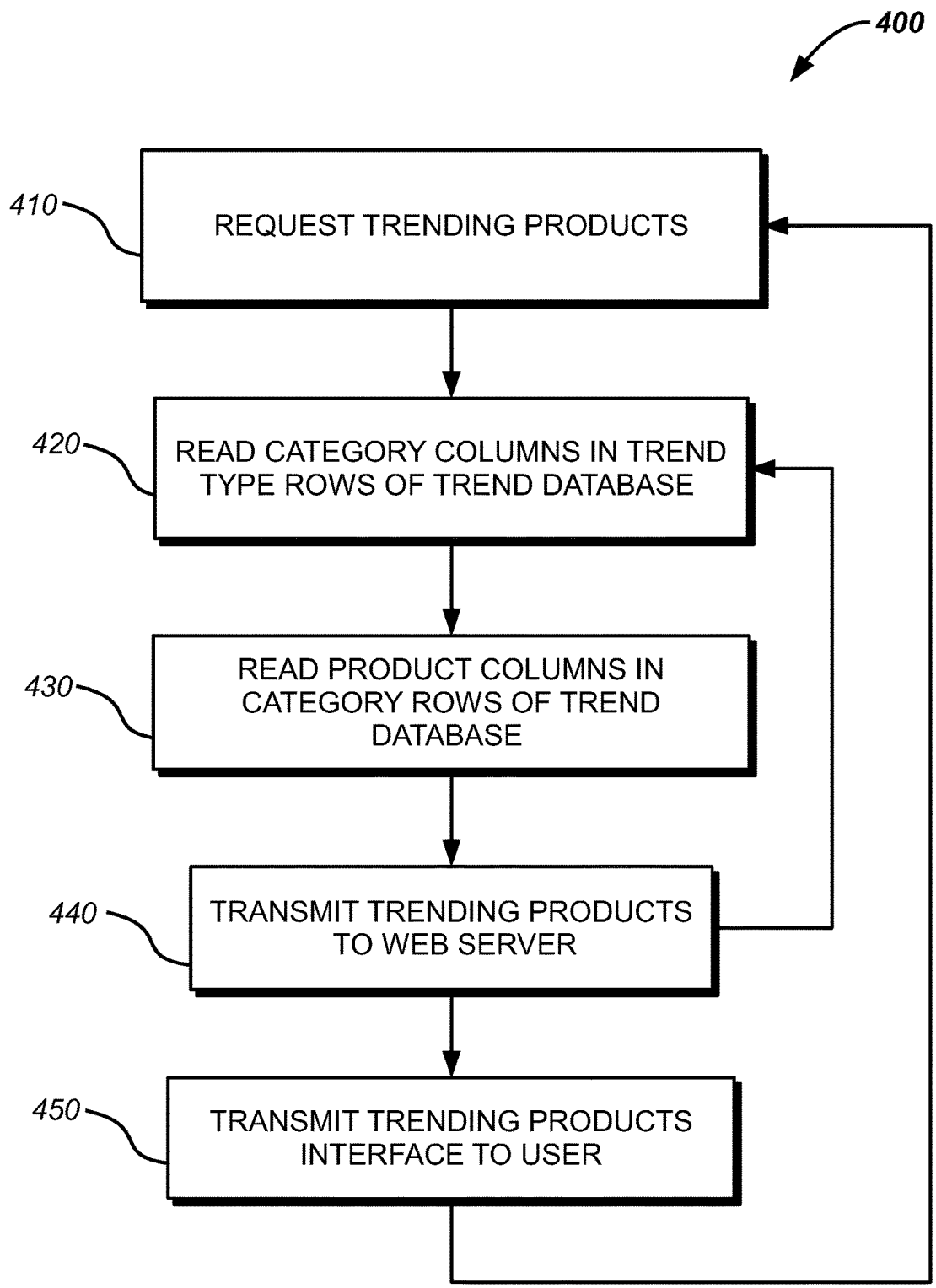
FIG. 4 is a flow chart illustrating a method for displaying trending products in accordance with embodiments of the present disclosure.

Referring now to FIG. 4, a method 400 for displaying trending products to a user is illustrated. At operation 410, web server 140 requests trending products from trend server 130. Such a request may indicate any category and/or trend type filters to be applied, as selected by the user. Alternatively, the user may select that no filter be applied, in which case the request is for all trend type actions for products in all categories.

At operation 420, trend server 130 reads category columns 240 in the trend type rows 220 having the most recent timestamp. If the user has not filtered out any trend types or categories, then trend server 130 can review every trend type row 220 having the current date in its row key. Within each of those rows 220, trend server 130 can read the key of each category column 240 to identify which columns 240 have a timestamp reflecting the most recently-executed batch. Alternatively, trend server 130 can search for products relating to earlier-completed runs by searching the keys of columns 240 for timestamps corresponding to a selected earlier time. By reviewing each column 240 having the desired timestamp within each row 220 having a desired trend type identifier, and by reading the counter value of the key of each column 240 and the category identified in the value of the column 240, trend server 130 is able to ascertain: one or more product categories that were identified in connection with the trend type, and the number of times a product from the identified product category was the subject of that trend type action. In an embodiment, operation 420 can be skipped if the user has selected certain categories to search.

At operation 430, trend server 130 reads product columns 230 in the category rows 210 of trend database 120. In an embodiment, trend server 130 searches for category rows 210 having a key that matches the trend type and product category identified from a trend type row at operation 420. Within a matching category row 210, trend server 130 can search for a column 230 having a timestamp matching the timestamp of a category column 240 identified at operation 420. In an alternative embodiment, trend server 130 searches for product columns 230 having a name that matches category columns 240 identified at operation 420. Alternatively, trend server 130 can read search the product columns 230 within a category row 210 having a key indicating a desired trend type and category combination as selected by the user. Once matching product columns 230 have been identified, trend server 130 can read the product identifier from the value of column 230.

According to embodiments of the present disclosure, trend server 130 can traverse across data in different time slots by searching for selected timestamps on columns (or searching for selected date stamps in rows), and thereby construct a depiction of what trends, products, and/or categories were prominent at a selected point in the past.

At operation 440, trend server 130 transmits to web server 140 the product name and trend type associated with the recorded trend action. At operation 450, web server 140 transmits computer-readable signals to the user computing device 190, directing the computing device 190 to display the products identified by trend server 130. In embodiments, web server 140 can query product database 180 for product-specific information, including pricing information, stock availability at a specific retail location, review score, and the like. Such information may then be displayed to the user.

Web server 140 may query trend server 130 for multiple products, to which trend server 130 can respond by repeating operations 420, 430, and 440. For example, in an embodiment, web server 140 requests 18 trending products to display on a user's interface. In response, trend server 130 searches trend database 120 according to methods disclosed herein until 18 products are identified according to the filtering parameters, if any, supplied in the request by web server 140. Results can be displayed on a user interface according to an "infinite scrolling" scheme, wherein as a user scrolls to the bottom of a display set on a web page (comprising, for example, 18 trending products from a selected time slot) a new set from a earlier time slot is loaded and displayed below.

In an embodiment, a user may request to view only trends according to one or more selected trend types, product categories, or combinations thereof. In response, trend server 130 can search only trend type rows 220 having matching trend types in the row key, thereby filtering out any unselected trend types. Trend server 130 can then filter out any unselected product categories by searching only category rows 210 having selected categories in the row key.

In an embodiment of the present disclosure, trend server 130 can consider known information about the customer in making a determination of which products and trend types to display. Such information about the customer may include past website browsing behavior, demonstrated interests, and/or prior purchases.

Although the present disclosure is described in terms of certain preferred embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the spirit and scope of the present disclosure.

What is claimed is:

1. A computer-implemented method comprising:
    receiving, with a trend aggregation computer system using one or more processors, a query from a mobile device of a user requesting trend data for at least one or more products, the trend data comprising product reviews, social media message mentions, or product transactions, wherein the trend aggregation computer system comprises a backend data collector, a trend database, a trend server, and a web server, wherein the web server is in data communication with the trend server to query the trend server for one or more trending products determined to be trending at a particular point in time based on the query;
    transmitting, by the trend aggregation computer system, a graphical user interface through an app on the mobile device of the user, wherein the graphical user interface comprises a webpage encoded in a markup language to display a representation of the trend data to the user for the one or more trending products at the particular point in time;
    retrieving, with the trend aggregation computer system, the trend data from one or more trend actions related to the at least one or more products, the one or more trend actions being from one or more online social networks, transaction databases, product review databases, or webpages;
    at the backend data collector, searching the one or more online social networks for the social media message mentions of the at least one or more products associated with the trend data related to the query of the user;

at the backend data collector, analyzing text strings from the social media message mentions for a positive term or a negative term of the at least one or more products to determine whether a product of the at least one or more products is a trending product of the one or more trending products;

at the backend data collector, analyzing transaction records of the at least one or more products purchased from the transaction databases, the transaction records comprising product identification codes, pricing information, and transaction dates;

at the backend data collector, analyzing the product reviews of the at least one or more products from the product review databases with quantifiable ratings given by one or more reviewers;

at the backend data collector, assigning a score to each of one or more of the social media message mentions of the at least one or more products associated with the one or more trend actions based at least in part on whether each of the one or more of the social media message mentions of the at least one or more products associated with the one or more trend actions have the positive term or the negative term;

at the backend data collector, receiving a dataset regarding the one or more trend actions, the dataset comprising:
  a product identifier;
  a category identifier;
  a trend type action; and
  the score of each of the one or more of the social media message mentions of the at least one or more products associated with the one or more trend actions;

at the backend data collector, sorting the dataset to populate a product column of one or more product columns in a category row of the trend database, wherein:
  a key for the category row comprises the category identifier;
  a value for the product column comprises the product identifier;
  the category identifier represents a single product category;
  the product identifier represents the product of the at least one or more products within the single product category; and
  a new category row is created each day in the trend database;

at the backend data collector, sorting the dataset to populate a category column of one or more category columns in a trend type row of the trend database by inserting at least the category column of the one or more category columns in the trend type row, wherein:
  a key for the trend type row comprises the trend type action;
  a value for the category column of the one or more category columns comprises the category identifier;
  each category column of the one or more category columns comprises a corresponding product column of the one or more product columns, the each category column of the one or more category columns and the corresponding product column of the one or more product columns represent a trend action of the one or more trend actions; and
  a new category column is created each day in the trend database;

at the trend database, searching the category column, thereby identifying a product category;

at the trend database, searching the product column, thereby identifying the product of the at least one or more products;

from the trend server, reading timestamps on the one or more category columns and the one or more product columns;

from the trend server, constructing a depiction of the at least one or more products that are trending at the particular point in time;

from the trend server, analyzing known information stored in a user database about the user to determine a set of trending products from the at least one or more products trending at the particular point in time to display, the set of trending products being associated with the query of the user, the known information comprising a predetermined set of filters determined by the user comprising specific options to view specific trend types or product categories; and at the web server, sending computer-readable data with instructions to display to the graphical user interface of the app on the mobile device of the user, a first display list of the set of trending products with trending product information, wherein as the user scrolls to a bottom of the first display list, a second display list from an earlier time than the first display list is loaded onto the graphical user interface, the trending product information comprises product specific information, a price, stock availability, or the product reviews.

2. The computer-implemented method of claim 1, wherein:
  the dataset further comprises a timestamp.

3. The computer-implemented method of claim 2, wherein:
  the value for the product column comprises the timestamp; and
  the key for the category row comprises the timestamp.

4. The computer-implemented method of claim 1, wherein:
  the value for the product column comprises a counter value;
  the key for the category row comprises the counter value; and
  the computer-implemented method further comprises:
    initializing the product column and setting the counter value to one; and
    initializing the category column and setting the counter value to one.

5. The computer-implemented method of claim 1, wherein the trend action comprises one of a group consisting of:
  best-rated products;
  newly pinned products;
  best seller products;
  recently reviewed products;
  just sold products; and
  products mentioned in other social platforms.

6. The computer-implemented method of claim 1, wherein:
  the value for the product column comprises a concatenation of a timestamp and a counter value;
  the key for the category row matches the value for the product column;
  the counter value corresponds to a count of occurrences of products in the dataset during a selected time interval, the products comprising the product;
  the timestamp reflects a start of a time interval.

7. A trend aggregation computer system for providing trending product information, comprising:
   a trend database comprising:
      a trend type row, comprising at least one category column; and
      a category row, comprising at least one product column;
   a backend data collector adapted to:
      search one or more online social networks for one or more social media message mentions of a product associated with a trend action of one or more trend actions, the one or more trend actions comprising online social networks, transaction databases, product review databases, or webpages;
      analyze text strings for a positive term or negative term comprising the one or more social media message mentions of the product associated with the trend action of the one or more trend actions to determine whether the product is a trending product;
      assign a score to each of the one or more social media message mentions of the product associated with the trend action of the one or more trend actions based at least in part on whether each of the one or more social media message mentions of the product associated with the trend action of the one or more trend actions comprises the positive term or the negative term;
      retrieve transaction records of the product in the transaction databases comprising product identification codes, pricing information, or transaction dates;
      retrieve product reviews from one or more product review databases;
      receive a dataset regarding the one or more trend actions, the dataset comprising:
         a product identifier;
         a category identifier;
         a trend type action; and
         the score of each of the one or more social media message mentions of the product associated with the one or more trend actions;
      sort the dataset to populate the at least one product column of one or more product columns in the category row of the trend database, wherein:
         a key for the category row comprises the category identifier;
         a value for the at least one product column comprises the product identifier;
         the category identifier represents a single product category; and
         the product identifier represents the product of at least one or more products within the single product category;
      sort the dataset to populate the at least one category column of one or more category columns in the trend type row of the trend database by inserting the at least one category column of the one or more category columns in the trend type row, wherein:
         a key for the trend type row comprises the trend type action; and
         a value for the at least one category column of the one or more category columns comprises the category identifier; and
         each category column of the one or more category columns comprises a corresponding product column of the one or more product columns, the each category column of the one or more category columns and the corresponding product column of the one or more product columns represent a trend action of the one or more trend actions;
      a new category column is created each day in the trend database;
   a trend server adapted to:
      receive a query from a mobile device of a user for one or more trending products, the one or more trending products comprising the product;
      transmit a graphical user interface through as an app on the mobile device of the user, wherein the graphical user interface comprises a webpage encoded in a markup language to display a representation of trend data to the user for the one or more trending products at a particular point in time;
      retrieving, with the trend aggregation computer system, the trend data from the one or more trend actions related to the at least one or more products, the one or more trend actions being 3 from the one or more online social networks, the transaction databases, the product review databases, or the webpages;
      search the trend database to identify at least one trending product of the one or more trending products by:
         searching the at least one category column, thereby identifying a product category;
         searching the at least one product column, thereby identifying the product; and
         analyzing known information stored in a user database about the to determine a set of trending products from the at least one or more products trending at the particular point in time to display, the one or more trending products comprising the set of trending products being associated with the query of the user the known information comprising a predetermined set of filters determined by the user comprising specific options to view specific trend types or product categories;
      construct a depiction of at least one or more trending products that are trending at the particular point in time;
   a web server adapted to:
      query the trend server for the one or more trending products determined to be trending at the particular point in time based on the query; and
      send computer-readable data with instructions to display to the graphical user interface of the app on the mobile device of the user, a first display list of the set of trending products with the trending product information in response to the query by the user, the trending product information, wherein as the user scrolls to a bottom of the first display list, a second display list from an earlier time than the first display list is loaded onto the graphical user interface, comprising product specific information, a price, stock availability, or the product reviews.

8. The trend aggregation computer system of claim 7, further comprising a web server adapted to:
   receive the product identifier from the trend server;
   construct a user interface, the user interface comprising the at least one trending product of the one or more trending products; and
   transmit the user interface to a user computing device for display to the user.

9. The trend aggregation computer system of claim 7, wherein the trend type comprises one of a group consisting of:

best-rated products;
newly pinned products;
best seller products;
recently reviewed products;
just sold products; and
products mentioned in other social platforms.

10. A method comprising:
receiving, with a trend aggregation computer system using one or more processors, a query from a mobile device of a user requesting trend data for at least one or more products, the trend data comprising product reviews, social media message mentions, or product transactions, wherein the trend aggregation computer system comprises a backend data collector, a trend database, a trend server, and a web server, wherein the web server is in data communication with the trend server to query the trend server for one or more trending products determined to be trending at a particular point in time based on the query;
transmitting, by the trend aggregation computer system, a graphical user interface through an app on the mobile device of the user, wherein the graphical user interface comprises a webpage encoded in a markup language to display a representation of the trend data to the user for the one or more trending products at the particular point in time;
retrieving, with the trend aggregation computer system, the trend data from one or more trend actions related to the at least one or more products, the one or more trend actions being from one or more online social networks, transaction databases, product review databases, and webpages;
at the backend data collector, searching the one or more online social networks for the social media message mentions of the at least one or more products related to the query of the user associated with a trend action of the one or more trend actions;
at the backend data collector, analyzing text strings from the social media message mentions for a positive term or negative term of a product of the at least one or more products to determine whether the product is a trending product of the one or more trending products;
at the backend data collector, analyzing transaction records of the at least one or more products purchased in the transaction databases, the transaction databases comprising product identification codes, pricing information, and transaction dates;
at the backend data collector, analyzing product reviews of the at least one or more products from the product review databases with quantifiable ratings given by one or more reviewers;
at the backend data collector, assigning a score to each of one or more of the social media message mentions of the at least one or more products associated with the one or more trend actions based at least in part on whether each of the one or more of the social media message mentions of the at least one or more products associated with the one or more trend actions that have the positive term or the negative term;
at the trend database, receiving a dataset regarding the trend action of the one or more trend actions, the dataset comprising:
a product identifier;
a category identifier;
a trend type; and
the score of each of the one or more of the social media message mentions of the product of the at least one or more products associated with the trend action of the one or more trend actions;
at the trend database, generating a product column in a category row in the trend database, wherein:
the category row has a key comprising the trend type and the category identifier;
the product column has a name comprising a timestamp and a counter value;
the product column has a value comprising the product identifier; and
a new product column is created each day in the category row;
at the trend database, generating a category column in a trend type row in the trend database by inserting at least the category column in the trend type row, wherein:
the trend type row has a key comprising the trend type;
the category column has a name comprising the timestamp and the counter value;
the category column has a value comprising the category identifier;
the category column corresponds to the product column, and the category column and the product column represent the trend action of the one or more trend actions; and
a new category column is created each day in the trend database;
at the trend database, searching the category column, thereby identifying the product category;
at the trend database, searching the product column, thereby identifying the at least one or more products;
from the trend server, reading timestamps on one or more category columns and one or more product columns;
from the trend server, constructing a depiction of the at least one or more products that are trending at the particular point in time;
from the trend server, analyzing known information stored in a user database about the user to determine a set of trending products from the at least one or more products trending at the particular point in time to display the set of trending products being associated with the query of the user, the known information comprising a predetermined set of filters determined by the user comprising specific options to view specific trend types or product categories; and
at the web server, sending computer-readable data with instructions to display to the graphical user interface of the app on the mobile device of the user, a first display list of the set of trending products with trending product information, wherein as the user scrolls to a bottom of the first display list, a second display list from an earlier time than the first display list is loaded onto the graphical user interface, the trending product information comprising at least product specific information, a price, stock availability, or the product reviews.

11. The method of claim 10, wherein:
the key of the category row further comprises a date stamp; and
the key of the trend type row further comprises the date stamp.

12. The method of claim 10, wherein the trend type comprises one of a group consisting of:
best-rated products;
newly pinned products;
best seller products;
recently reviewed products;
just sold products; and
products mentioned in other social platforms.

13. The computer-implemented method of claim 1, wherein:
- transmitting, with the trend aggregation computer system, the set of trending products to the user comprises:
  - determining the set of trending products based at least in part on at least one of:
    - past website browsing behavior of the user;
    - one or more demonstrated interests of the user; or
    - one or more purchases by the user.

14. The computer-implemented method of claim 1, wherein:
- transmitting, with the trend aggregation computer system, the set of trending products to the user comprises:
  - determining the set of trending products based at least in part on at least one of:
    - past website browsing behavior of the user;
    - one or more demonstrated interests of the user; or
    - one or more purchases by the user;
- the dataset further comprises a timestamp;
- the key for the product column comprises the timestamp and a counter value;
- the key for the category column comprises the timestamp and the counter value;
- the key for the category column matches the key for the product column;
- the trend action comprises one of a group consisting of:
  - best-rated products;
  - newly pinned products;
  - best seller products;
  - recently reviewed products;
  - just sold products; and
  - products mentioned in other social platforms;
- the counter value corresponds to a count of occurrences of products in the dataset during a selected time interval, the products comprising the product;
- the timestamp reflects a start of a time interval; and
- the method further comprises:
  - initializing the product column and setting the counter value to one; and
  - initializing the category column and setting the counter value to one.

15. The trend aggregation computer system of claim 7, wherein:
- the trend server adapted to transmit the set of trending products to the user comprises:
  - determining the set of trending products based at least in part on at least one of:
    - past website browsing behavior of the user;
    - one or more demonstrated interests of the user; or
    - one or more purchases by the user.

16. The trend aggregation computer system of claim 7, wherein:
- the dataset further comprises a timestamp;
- a value for the at least one product column comprises the timestamp; and
- the key for the category row comprises the timestamp.

17. The trend aggregation computer system of claim 7, wherein:
- a value for the at least one product column comprises a counter value; and
- the key for the category row comprises the counter value.

18. The trend aggregation computer system of claim 7, wherein:
- the trend server adapted to transmit the set of trending products to the user comprises:
  - determining the set of trending products based at least in part on at least one of:
    - past website browsing behavior of the user;
    - one or more demonstrated interests of the user; or
    - one or more purchases by the user;
- the dataset further comprises a timestamp;
- the key for the at least one product column comprises the timestamp and a counter value;
- the key for the at least one category column comprises the timestamp and the counter value;
- the trend action comprises one of a group consisting of:
  - best-rated products;
  - newly pinned products;
  - best seller products;
  - recently reviewed products;
  - just sold products; and
  - products mentioned in other social platforms; and
- the trend aggregation computer system further comprises a web server adapted to:
  - receive the product identifier from the trend server;
  - construct a user interface, the user interface comprising the at least one trending product of the one or more trending products; and
  - transmit the user interface to a user computing device for display to the user.

19. The method of claim 10, wherein:
- transmitting, with the trend aggregation computer system, the set of trending products to the user comprises:
  - determining the set of trending products based at least in part on at least one of:
    - past website browsing behavior of the user;
    - one or more demonstrated interests of the user; or
    - one or more purchases by the user.

20. The method of claim 10, wherein:
- transmitting, with the trend aggregation computer system, the set of trending products to the user comprises:
  - determining the set of trending products based at least in part on at least one of:
    - past website browsing behavior of the user;
    - one or more demonstrated interests of the user; or
    - one or more purchases by the user;
  - the key of the category row further comprises a date stamp;
  - the key of the trend type row further comprises the date stamp; and
  - the trend type comprises one of a group consisting of:
    - best-rated products;
    - newly pinned products;
    - best seller products;
    - recently reviewed products;
    - just sold products; and
    - products mentioned in other social platforms.

* * * * *